(12) United States Patent
Marukawa et al.

(10) Patent No.: US 6,255,013 B1
(45) Date of Patent: Jul. 3, 2001

(54) SEALED STORAGE BATTERY AND METHOD OF PRODUCING SAME

(75) Inventors: Shuhei Marukawa, Moriguchi; Hiroshi Inoue, Neyagawa; Shinji Hamada, Hirakata; Munehisa Ikoma, Nara-ken, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/066,672

(22) Filed: Apr. 28, 1998

(30) Foreign Application Priority Data

Jul. 2, 1996 (JP) .................................................... 8-172007

(51) Int. Cl.$^7$ ...................................................... H01M 2/12
(52) U.S. Cl. ................................ 429/82; 429/53; 429/89; 429/72
(58) Field of Search ................................ 429/53, 54, 55, 429/82, 89, 72

(56) References Cited

U.S. PATENT DOCUMENTS

| | | |
|---|---|---|
| 3,713,895 | 1/1973 | Consolloy . |
| 4,191,807 | 3/1980 | Karpal . |
| 4,695,519 | 9/1987 | Rao et al. . |
| 4,720,439 | 1/1988 | Hruden . |
| 4,851,305 | 7/1989 | Kump et al. . |
| 5,356,733 | 10/1994 | Green et al. . |
| 5,554,455 | 9/1996 | Inoue et al. . |
| 5,856,037 | * 1/1999 | Casale et al. ........................ 429/82 |

FOREIGN PATENT DOCUMENTS 0692829   1/1996   (EP) .

OTHER PUBLICATIONS

European Search Report dated Mar. 17, 2000.
Patent Abstracts of Japan, vol. 010, No. 168 (E–455), Nov. 18, 1986 & JP 61 143935A (Matsushita Electric Ind Co Ltd), Jul. 1, 1986.
Patent Abstracts of Japan, vol. 012, No. 168 (E–611), May 20, 1988 & JP 62 281262A (Shin Kobe Electric Mach Co Ltd), Dec. 7, 1987.
Patent Abstracts of Japan, vol. 010, No. 108 (E–398), Apr. 23, 1986 & JP 60 246557 A (Matsushita Denki Sangyo KK), Dec. 6, 1985.
Patent Abstracts of Japan, vol. 012, No. 328 (E–654), Sep. 6, 1988 & JP 63 091952 A (Japan Storage Battery Co Ltd), Apr. 22, 1988.
Patent Abstracts of Japan, vol. 014, No. 489 (E–0994), Oct. 24, 1990 & JP 02 201869 A (Matsushita Electric Ind Co Ltd), Aug. 10, 1990.

* cited by examiner

Primary Examiner—Maria Nuzzolillo
Assistant Examiner—Monique Wills
(74) Attorney, Agent, or Firm—Stevens, Davis, Miller & Mosher, L.L.P.

(57) ABSTRACT

A sealed storage battery includes a battery case containing a group of electric power-generating elements each comprising a positive electrode, a negative electrode and a separator, a battery case lid closing an opening in the battery case to seal the battery case, and a safety valve of the assembling type mounted on the battery case lid. The safety valve is welded to the battery case lid. With this construction, a hermetic seal at an area of contact between the safety valve and the battery case lid is enhanced, and also the reliability of the safety valve is enhanced.

9 Claims, 5 Drawing Sheets

SEALED STORAGE BATTERY AND METHOD OF PRODUCING SAME

BACKGROUND OF THE INVENTION

1. Field of the Invention

This invention relates to a sealed storage battery with a safety valve and also to a method of producing such a battery. This invention is also a divisional of 08/742,827 now abandoned.

2. Description of the Related Art

Recently, storage batteries or cells have been used in various appliances including an electric home appliance and an electric car, and above all there has been a strong demand for medium-sized and large-sized cells (generally, the capacity of a medium-sized cell is 10 to 100 Ah, and the capacity of a large-sized cell is 100 Ah or more) with a high energy density and high reliability, used as a movement-purpose power source for driving or moving an electric car or the like. A nickel-cadmium storage battery of the vent type and a lead storage battery of the vent type have heretofore been used as such a medium- or large-sized cell for energy storage purposes and UPS purposes. However, it is important that the movement-purpose power source should have a high energy density.

To meet this requirement, and more specifically to improve the energy density and the service life, attention has now been directed to a nickel-hydrogen storage battery instead of a nickel-cadmium storage battery and a lead storage battery. One characteristic of this nickel-hydrogen storage battery is that gas is produced in a battery case when the battery is charged and discharged, and therefore the battery is sealed so as to prevent the gas from leaking to the exterior of the battery, thereby preventing an electrolyte from being dried up.

In order to form a medium- or large-sized cell with a high energy density and a long service life, which is represented by a nickel-hydrogen storage battery, into a sealed construction, it is necessary to confine gas, produced during charging and discharging, within the cell, and it is also necessary to accurately set an operating pressure of a safety valve, which serves to discharge this gas in the event of an abnormal condition, to 2 to 8 $kg/cm^2$. The operating pressure of the simple-type, e.g. cap-type, safety valve has varied greatly, so that the performance of the battery could not be fully achieved. And besides, since such a high pressure develops within the battery, a strength of fixing of a fixing portion between the safety valve and a battery case lid, as well as a hermetic seal of this fixing portion, must be improved.

Furthermore, if the operating pressure of the safety valve is less than 2 $kg/cm^2$, the valve operates even in a normal condition, so that the battery can not be kept in a sealed condition, and in contrast if the operating pressure is more than 8 $kg/cm^2$, there is a possibility that the battery case is ruptured. Therefore, it is important that the operating pressure of the safety valve should be accurately set to the predetermined range, and it has been essential to check the operating pressure of the safety valve before the safety valve is mounted on the battery case.

However, in the type of construction in which the safety valve of the assembling type is fixedly secured to the battery case by screw tightening, there is a possibility that screw-fastened portions become loose by vibrations of the moving body (e.g. vehicle) and the expansion and contraction of the lid due to a change of the internal pressure during the charging and discharging of the battery, so that there is a possibility that the gas and the electrolyte leak to the exterior. When the safety valve is mounted on the battery case through a packing of rubber or the like so as to enhance the hermetic seal, the packing, firmly clamped for a long time period, is affected by aging and thermal deterioration, which results in a possibility that the hermetic effect is lost, so that the gas, produced within the battery, as well as the electrolyte, leaks to the exterior.

In the type of construction in which the safety valve of the assembling type is fixedly fitted in the battery case, a fixing strength and a hermetic effect are lower than in the above construction in which the safety valve is fixed to the battery case by screw tightening, and therefore there is a possibility that the gas, produced within the battery, as well as the electrolyte, leaks to the exterior.

SUMMARY OF THE INVENTION

With the above problems in view, it is an object of this invention to provide a sealed storage battery in which a strength of fixing of a fixing portion between a safety valve and a battery case, as well as a hermetic effect, is enhanced.

To achieve the above object, a safety valve of the assembling type is welded to a battery case lid of a sealed storage battery. With this construction, even if the internal pressure of the battery rises as a result of production of gas during over charge and over discharge, so that the battery case lid is deformed, adverse effects will not be encountered, and that portion of the safety valve fixed to the battery case lid will not be damaged, thus ensuring the proper operation of the safety valve.

A group of electric power-generating elements are inserted into the battery case, and a battery case and the battery case lid are welded together, and an electrolyte is poured into the battery case through a liquid-pouring hole formed through the battery case lid. Thereafter, the pre-assembled safety valve is welded to the battery case lid in such a manner that the safety valve is fitted in the liquid-pouring hole. With this method, the operating pressure of the safety valve is checked before it is fixed to the battery case lid, and therefore the safety valve, having the improper operating pressure, will not be used, and besides the liquid-pouring hole is used not only for pouring the electrolyte but also for mounting the safety valve on the battery case lid, and therefore the number of the holes formed in the battery case and the battery case lid is reduced, thus reducing the number of those portions where the liquid (electrolyte) may leak, thereby enhancing the liquid leakage resistance.

DETAILED DESCRIPTION OF THE PREFERRED EMBODIMENTS

Figure 1:
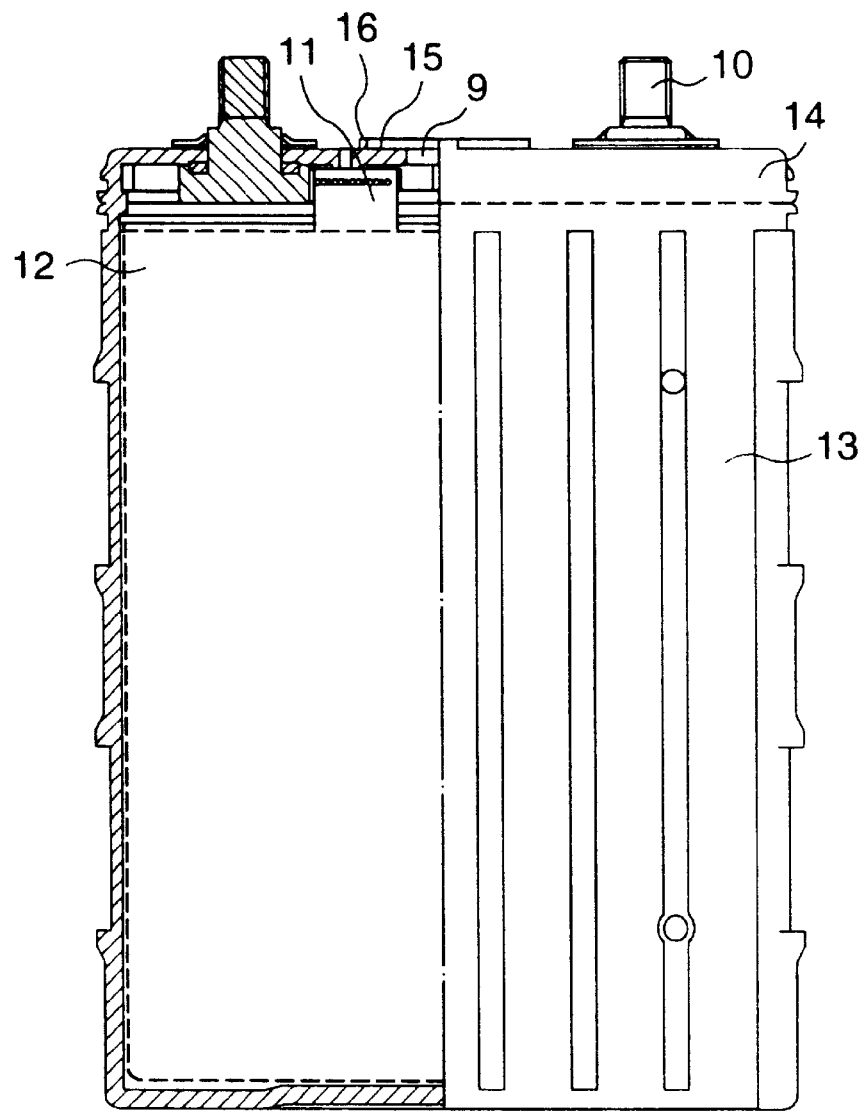
FIG. 1 is a partly cross-sectional view of a battery case of a preferred embodiment of the present invention.
Figure 2:
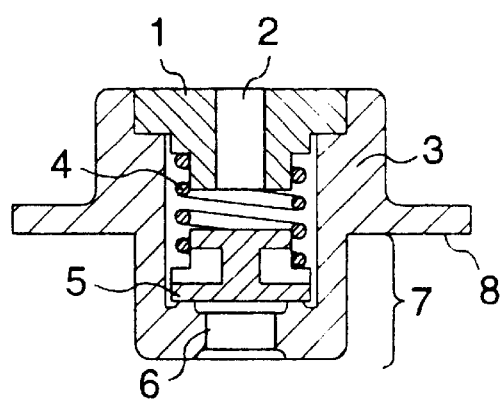
FIG. 2 is a cross-sectional view of a safety valve of the assembling type used in the embodiment of the invention.

One preferred embodiment of the present invention will now be described with reference to the drawings. As shown in FIG. 1, in a battery of the present invention, a group of electric power-generating elements 12, each comprising a positive electrode, a negative electrode and a separator, are contained in a battery case 13 made of a synthetic resin. The positive electrodes are connected to one terminal post 10 through respective leads 11 while the negative electrodes are connected to the other terminal post 10 through respective leads 11. An open top of the battery case 13 is closed by a battery case lid 14, and the terminal posts 10 are mounted on the battery case lid 14, and also a liquid-pouring hole or port 9 is formed through the battery case lid 14. The battery case lid 14 has a ring-shaped welding portion 15 and a ring-shaped bank portion (ridge) 16 which are formed around the liquid-pouring hole 9. A safety valve of the assembling type shown in FIG. 2 is attached to the battery case lid 14, and is fixedly secured thereto with a lower portion 7 of the safety valve fitted in the liquid-pouring hole 9.

Referring to the construction of the safety valve, a rubber valve 5 and a safety valve spring 4 are mounted within a safety valve body 3, and these members 5 and 4 are held in position by a safety valve lid 1. With respect to the operation of the safety valve, the pressure within the battery acts on the rubber valve 5 through a vent hole 6, formed in the lower portion 7 of the safety valve, to urge the rubber valve 5 upward. The rubber valve 5 is movably held by the safety valve spring 4, and when the internal pressure of the battery rises to urge the rubber valve 5 upward, the rubber valve 5 moves upward away from a valve seat on the safety valve body 3, so that gas, produced within the battery, flows through this valve seat and a discharge port 2, and is discharged to the exterior of the battery. An annular or ring-shaped welding portion 8 is formed on and projects from an outer peripheral surface of the safety valve body 3 at a central portion thereof, and this welding portion 8 is welded to that portion of the upper surface of the battery case lid 14 encircled by the annular bank portion 16.

EXAMPLE 1

Figure 3:
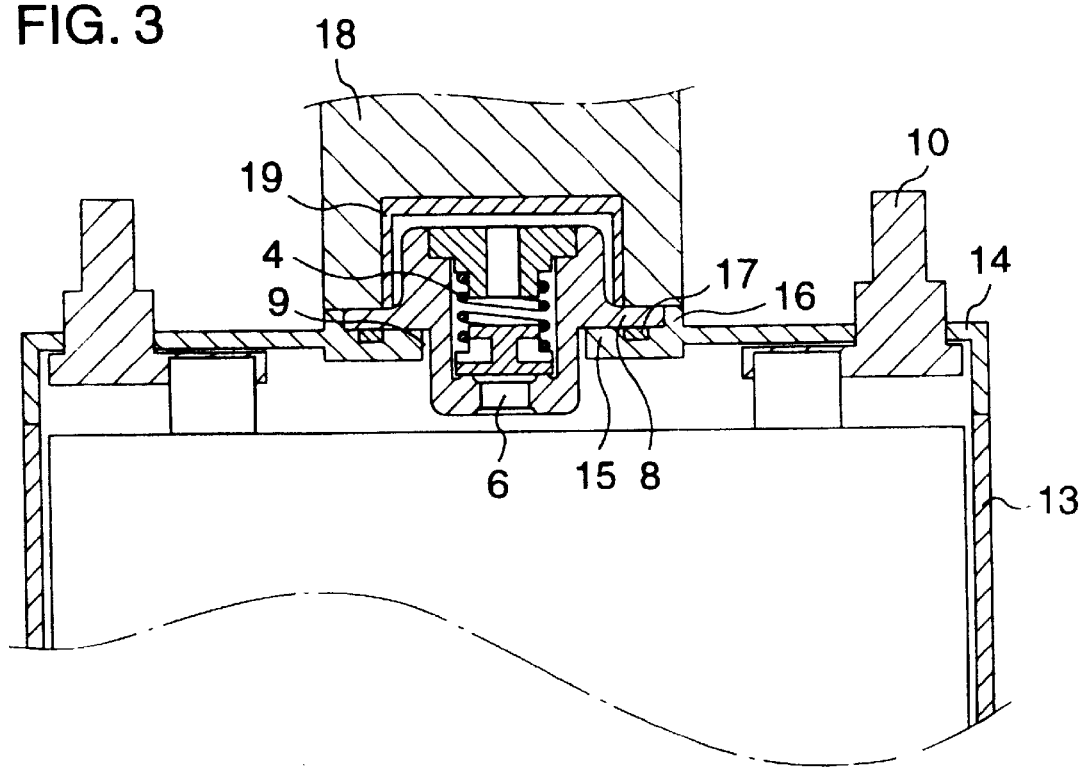
FIG. 3 is a cross-sectional view showing a high-frequency welding process in Example 1 of the invention.

As shown in FIG. 3, in this Example of a battery of a construction as described above, a liquid-pouring hole 9 is formed through a central portion of a battery case lid 14, and a safety valve is fixedly secured to the battery case lid 14 in such a manner that a lower portion 7 of the safety valve having a vent hole 6 is fitted in the liquid-pouring hole 9. At this time, a heat-generating ring 17, made of SUS304, is interposed between a welding portion 8 of the safety valve and a welding portion 15 of the battery case lid 14. In this condition, the safety valve is covered with a coil 18, and electric current is caused to flow through the coil 18, thereby producing a magnetic field. Because of this magnetic field, electric current flows through the heat-generating ring 17, and the heat-generating ring 17 is heated because of its specific resistance, and the two welding portions 15 and 8 are fused or melted by this heat, and are welded (or fusion bonded) together. At this time, since the two welding portions 15 and 8 have a circular or annular shape, the two welding portions 15 and 8 are melted uniformly over the entire circumferences thereof to form a uniform welded portion of a circular shape. Since the welding portion 8 of the safety valve is received in a recess defined by the upper surface of the battery case lid 14 and a ring-shaped bank portion 16, the molten resin is prevented from dissipating or flowing outwardly beyond the bank portion 16, so that the two welding portions 15 and 8 are bonded or welded together satisfactorily. A metal cap 19 is attached to the safety valve to cover the upper portion thereof, and shields a safety valve spring 4 from the magnetic field, and with this arrangement electric current will not flow through the safety valve spring 4, and therefore the safety valve spring 4 will not be heated, thereby preventing a safety valve body 3 from being melted. Before the safety valve was welded to the battery case lid 14, its operating pressure was checked, and only those safety valves having the proper operating pressure were used.

EXAMPLE 2

Figure 4:
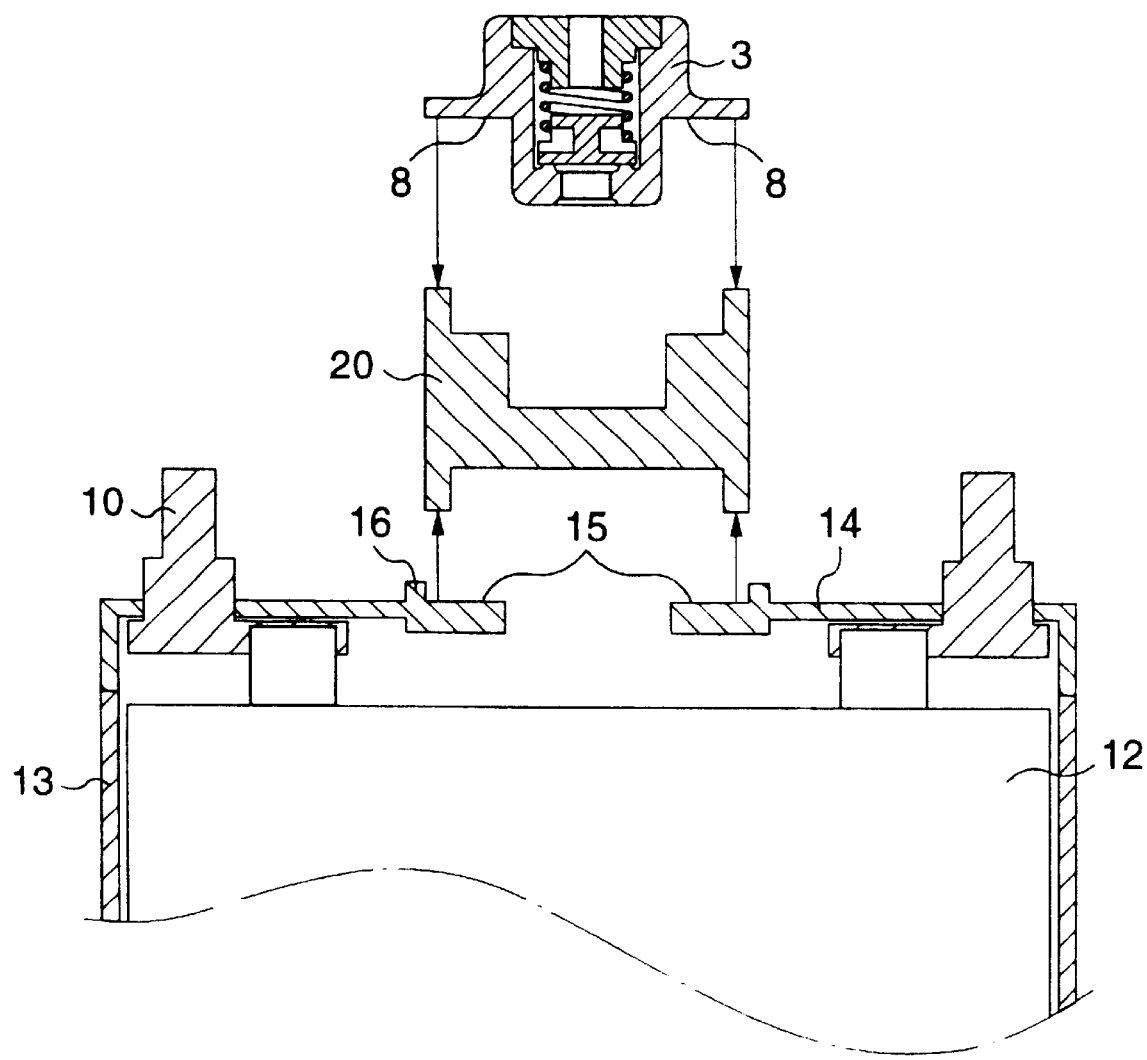
FIG. 4 is a cross-sectional view showing a heat welding process in Example 2 of the invention.

In this Example, a heat plate 20 was used to melt or fuse welding portions 8 and 15 of a safety valve body 3 and a battery case lid 14, and then the two welding portions 8 and 15 were welded together. As shown in FIG. 4, a battery of this Example is generally similar in construction to that of Example 1. Those portions, i.e., welding portions 8 and 15, of the safety valve body 3 and the battery case lid 14 to be welded together were held against the heat plate 20 heated to about 270° C., and were melted, and subsequently the welding portion 15 of the battery case lid 14 and the welding portion 8 of the safety valve body 3 were pressed into intimate contact with each other to be welded together.

EXAMPLE 3

Figure 5:
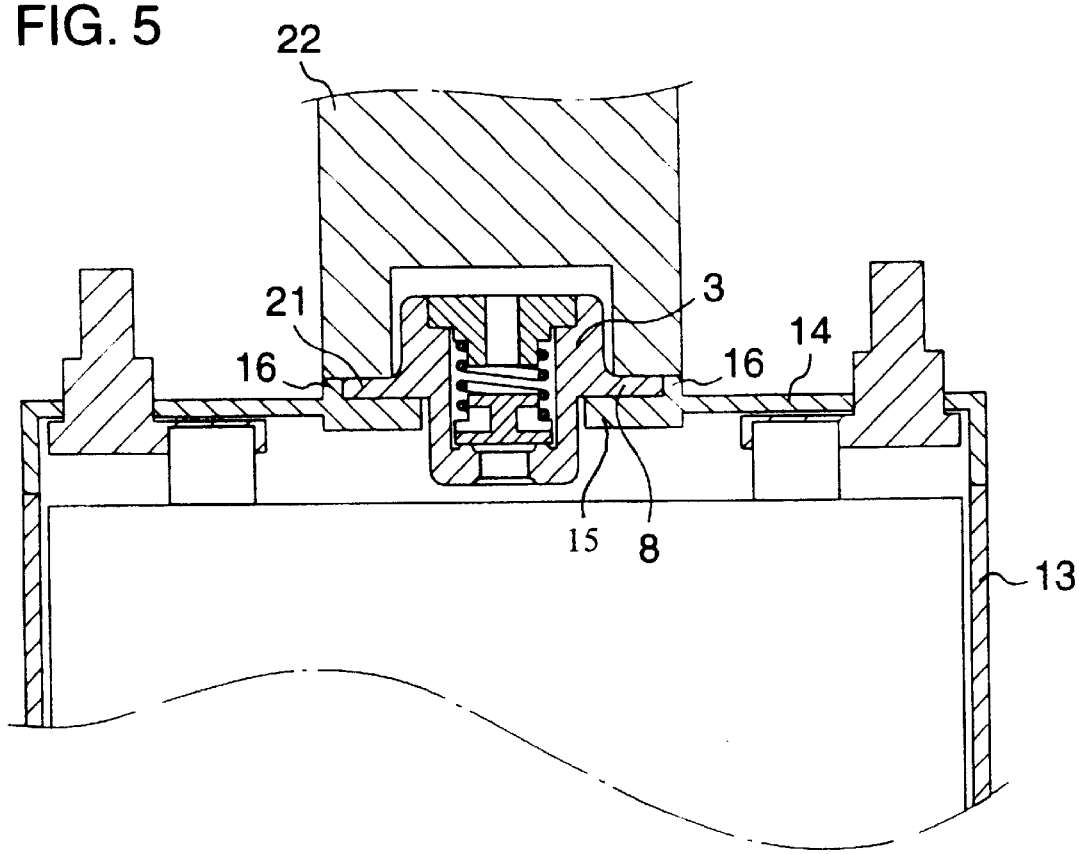
FIG. 5 is a cross-sectional view showing a spinning welding process in Example 3 of the invention.
Figure 6:
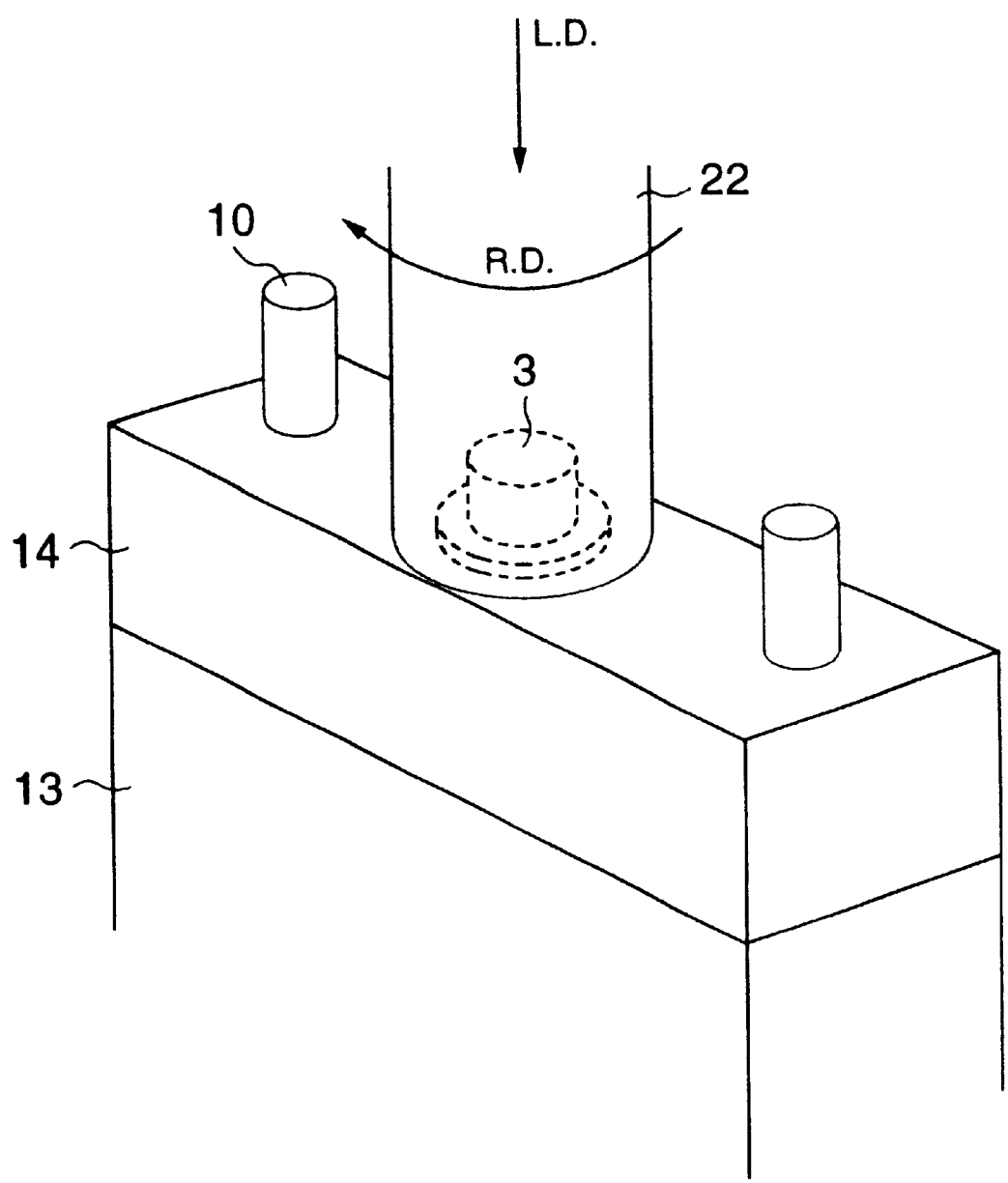
FIG. 6 is a perspective view showing the spinning welding process in Example 3 of the invention.

In this Example, welding portions 8 and 15 of a safety valve body 3 and a battery case lid 14 were melted by frictional heat, and were welded together. As shown in FIG. 5, a battery of this Example is generally similar in construction to that of Example 1. The safety valve body 3 was held by a rotary jig 22, and was rotated at a high speed of 3,800 rpm in a direction indicated by arrow R.D. in FIG. 6. In this condition, the welding portion 8 of the safety valve body 3 was pressed against the welding portion 15 of the battery case lid 14 under a pressure of 3.5 kgf/cm$^2$ for one second in a direction indicated by arrow L.D. in FIG. 6, so that the two welding portions 8 and 15 were heated by friction at an area 21 of contact therebetween, and they were kept pressed against each other for five minutes to be welded together. Thus, the safety valve body 3 and the battery case lid 14 were welded together by this spinning welding method. At this time, since the welding portion 8 of the safety valve was received in a recess defined by the upper surface of the battery case lid 14 and a ring-shaped bank portion 16, the molten resin was prevented from dissipating or flowing outwardly beyond the bank portion 16.

In the above Examples of the present invention, preferably, the safety valve and the battery case lid are formed of the same material, and this material is made mainly of one of modified PPE, PP, ABS and PPE/PP alloy.

The operating pressure of the safety valve is 2 to 8 kgf/cm$^2$.

The strength of welding between the safety valve and the battery case lid is 10 to 150 kgf.

The area of the welded portion at which the safety valve and the battery case lid are welded together is 200 to 450 mm$^2$.

The depth of welding of the welded portion at which the safety valve and the battery case lid are welded together is 0.5 to 2 mm.

Preferably, the electrolyte is poured into the battery case through the liquid-pouring hole while the interior of the battery case is kept to a vacuum. Alternatively, the electrolyte is poured while the battery case is subjected to an centrifugal action.

When the safety valve is welded to the battery case lid, the safety valve and the battery case lid are pressed against each other at a pressure of 30 to 110 kgf.

COMPARATIVE EXAMPLE 1

Figure 7:
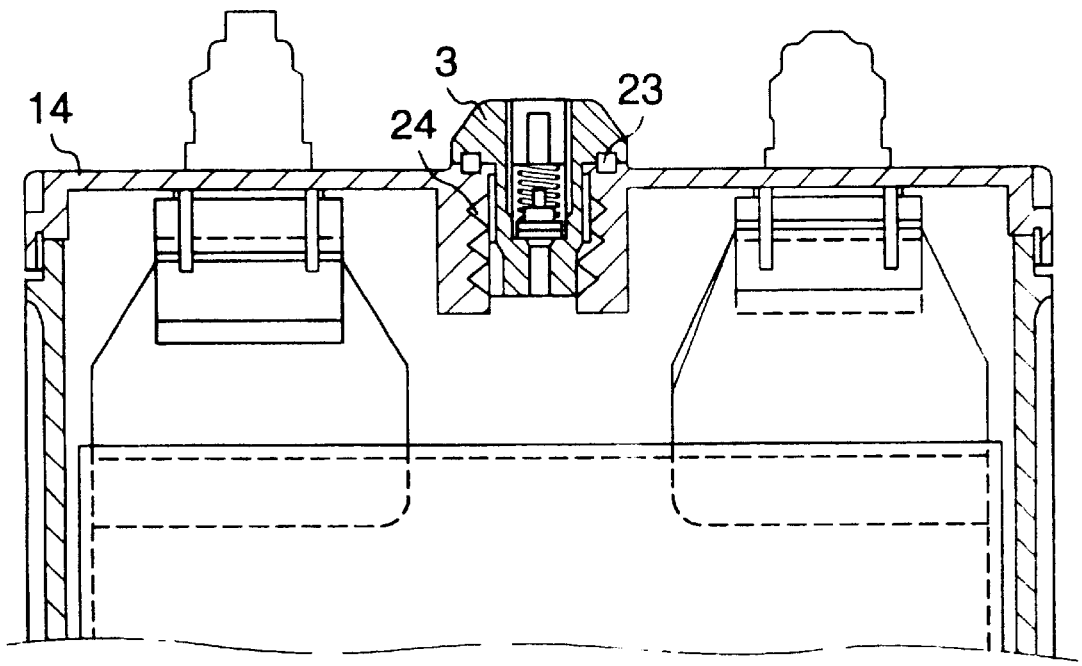
FIG. 7 is a cross-sectional view showing a screw-fastening construction in Comparative Example 1.
Figure 8:
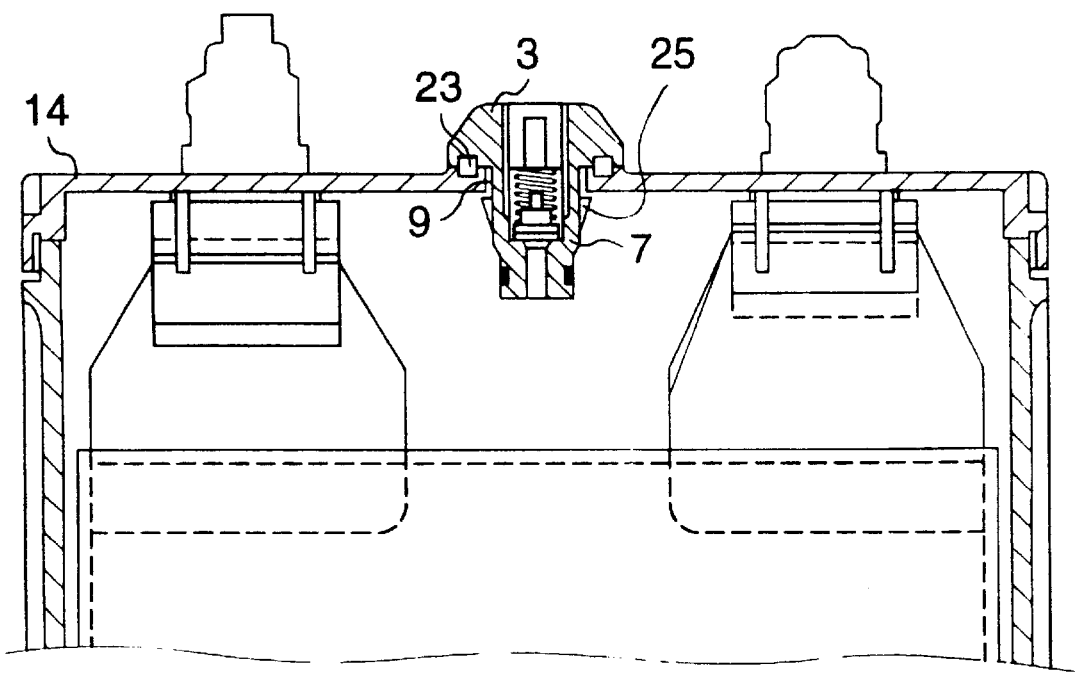
FIG. 8 is a cross-sectional view showing a fitting fixing construction in Comparative Example 2.

As Comparative Example 1, there was used a fixing method utilizing screw tightening. As shown in FIG. 7, an internally-threaded portion and an externally-threaded portion were formed respectively on a battery case lid 14 and a safety valve body 3 when each of the battery case lid 14 and the safety valve body 3 was integrally molded. The safety valve body 3 was fixed to the battery case lid 14 by screwing the externally-threaded portion into the internally-threaded portion as at 24. At this time, an O-ring 23 was interposed between the battery case lid 14 and the safety valve body 3 to provide an enhanced sealing effect.

COMPARATIVE EXAMPLE 2

In this Comparative Example 2, a fitting projection 25 was formed on an outer peripheral surface of a lower portion 7 of a safety valve, and when the lower portion 7 of the safety valve was fitted in a liquid-pouring hole 9, the fitting projection 25 was forced through the liquid-pouring hole 9, thereby fixing the safety valve to a battery case lid 14. In this Comparative Example, also, an O-ring was interposed between the battery case lid 14 and a safety valve body 3 to provide an enhanced sealing effect.

Results of evaluation of the above Examples 1 to 3 and Comparative Examples 1 and 2 are shown in Table 1. Evaluation was made with respect to a hermetic effect (seal) and vibration resistance. With respect to the hermetic effect, each of the Example and Comparative Examples was reserved in the cell state in a semi-mill vessel, and the evaluation was determined by how many days it took before an alkaline reaction appeared around the welded portion. With respect to the vibration resistance, the battery was vibrated at a frequency of 33.3 Hz and an acceleration of 5.5 G for two hours, and then the interior of the battery was pressurized to 1 to 8 kgf/cm$^2$, and then it was confirmed, using a leakage test liquid, whether or not the air leaked through the welded portion.

TABLE 1

| Fixing method | Evaluation | |
|---|---|---|
| | Hermetic Effect | Vibration resistance |
| Example 1 | 1 month | No air leakage at 8 kgf/cm$^2$ |
| Example 2 | 1 month | No air leakage at 8 kgf/cm$^2$ |
| Example 3 | 1 month | No air leakage at 8 kgf/cm$^2$ |
| Compara. Ex. 1 | 2 days | Air leakage at 1 kgf/cm$^2$ |
| Compara. Ex. 2 | a day | Air leakage at 1 kgf/cm$^2$ |

As shown in Table 1, the hermetic effect and the liquid leakage resistance were enhanced with the constructions of Examples 1, 2 and 3 as compared with Comparative Examples 1 and 2.

In the Examples of the invention, an organic solvent can be coated onto the welding portions, in which case the fixing portions of the safety valve and the battery case lid dissolved, and their substrates are fusion bonded together, thereby eliminating a defective hermetic seal resulting from pinholes or the like.

As described above, in the present invention, the safety valve of the assembling type and the battery case lid are fixed together by welding their contact surfaces together to fusion bond their substrates together. With this construction, the sealing effect is not affected by the aging and thermal deterioration of a rubber packing, and besides the safety valve is fixedly secured to the battery case lid after the operating pressure of the safety valve is confirmed, and therefore the battery, including the safety valve having the improper operating pressure, will not be produced, and there can be provided the sealed storage battery capable of exhibiting excellent reliability for a long period of time.

The group of electric power-generating elements are inserted into the battery case, and the battery case lid is weld to the battery case, and the electrolyte is poured into the battery case through the liquid-pouring hole formed through the battery case lid. Then, after the operation of the safety valve is confirmed, the safety valve is fixedly fitted in the liquid-pouring hole through which the electrolyte was poured into the battery case. With this construction, the number of the holes formed in the battery case and the battery case lid can be reduced, and therefore there can be provided the sealed storage battery which satisfactorily withstands a change in the internal pressure of the battery.

What is claimed is:

1. A method of producing a sealed storage battery, comprising the steps of:
    (a) inserting groups of electric power-generating elements into a battery case, each of said groups of power-generating elements comprising a positive electrode, a negative electrode and a separator;
    (b) welding a battery case lid, having a liquid-pouring hole formed therein, to said battery case;
    (c) pouring an electrolyte into said battery case through said liquid-pouring hole formed in said battery case lid; and
    (d) welding a preassembled safety valve to said liquid-pouring hole in such a manner that said safety valve is welded thereto by pressing said safety valve to said battery case lid while rotating the safety valve.

2. A method according to claim 1, wherein step (d) includes (i) rotating the safety valve at a speed of 3,800 rpm, (ii) pressing said safety valve to said battery case lid under a pressure of 3.5 kgf/cm$^2$ for one second to heat said safety valve and said battery case lid by friction at an area of contact therebetween and (iii) thereafter keeping said safety valve and said battery case lid pressed together for five minutes to weld them together.

3. A method according to claim 1, wherein the safety valve and the battery case lid are formed of the same material which is mainly made of one of modified polyphenylether (PPE), polypropylene (PP), acrylonitrile-butadiene-styrene (ABS) and polyphenylenether/polypropylene PPE/PP) alloy.

4. A method according to claim 1, wherein step (c) includes pouring said electrolyte into said battery case through said liquid-pouring hole while an interior of the battery case is kept to a vacuum.

5. A method according to claim 2, wherein step (c) includes pouring said electrolyte into said battery case through said liquid-pouring hole while an interior of the battery case is kept to a vacuum.

6. A method according to claim 1, wherein step (c) includes pouring said electrolyte into said battery case through said liquid-pouring hole while an interior of the battery case is subjected to a centrifugal action.

7. A method according to claim 2, wherein step (c) includes pouring said electrolyte into said battery case through said liquid-pouring hole while an interior of the battery case is subjected to a centrifugal action.

8. A method according to claim 2, wherein step (d)(iii) includes pressing said safety valve and said battery case lid together at a pressure of 30 to 110 kgf.

9. A method according to claim 1, in which said safety valve of a resin and said battery case lid of a resin are welded together by melting their welding portions by one of (i) high frequency, (ii) heat and (iii) friction.

* * * * *